(12) United States Patent
Wang et al.

(10) Patent No.: US 10,150,122 B2
(45) Date of Patent: Dec. 11, 2018

(54) SHOWER HEAD STRUCTURE

(71) Applicant: Xiamen Lota International Co., Ltd., Xiamen (CN)

(72) Inventors: Xuedong Wang, Xiamen (CN); Jiangcheng Zhang, Xiamen (CN); Yuzheng Wu, Xiamen (CN)

(73) Assignee: XIAMEN LOTA INTERNATIONAL CO., LTD., Xiamen, Fujian (CN)

( * ) Notice: Subject to any disclaimer, the term of this patent is extended or adjusted under 35 U.S.C. 154(b) by 10 days.

(21) Appl. No.: 15/347,782

(22) Filed: Nov. 10, 2016

(65) Prior Publication Data
US 2018/0126393 A1   May 10, 2018

(51) Int. Cl.
*B05B 1/16*     (2006.01)
*B05B 1/18*     (2006.01)
*B05B 12/00*    (2018.01)
*E03C 1/084*    (2006.01)

(52) U.S. Cl.
CPC .......... *B05B 1/1609* (2013.01); *B05B 1/1681* (2013.01); *B05B 1/185* (2013.01); *B05B 12/002* (2013.01); *E03C 1/084* (2013.01)

(58) Field of Classification Search
CPC ..... B05B 1/1609; B05B 1/185; B05B 12/002; B05B 1/1681; E03C 1/084
USPC .......... 239/419.5, 428.5, 443, 444, 446–449, 239/525, 530, 583, 586, 590–590.5, 556, 239/557, 558
See application file for complete search history.

(56) References Cited

U.S. PATENT DOCUMENTS

| | | | | |
|---|---|---|---|---|
| 4,303,201 A | * | 12/1981 | Elkins | B05B 1/1636 239/447 |
| 5,201,468 A | * | 4/1993 | Freier | B05B 1/1654 239/449 |
| 6,382,531 B1 | * | 5/2002 | Tracy | B05B 1/185 239/556 |
| 7,494,074 B2 | * | 2/2009 | Benstead | B05B 1/1618 239/11 |
| 9,545,639 B2 | * | 1/2017 | Meehan | B05B 1/1627 |
| 9,649,645 B2 | * | 5/2017 | Erickson | B05B 1/326 |
| 9,707,572 B2 | * | 7/2017 | Erickson | B05B 1/1618 |

* cited by examiner

*Primary Examiner* — Steven J Ganey
(74) *Attorney, Agent, or Firm* — Leong C. Lei

(57) ABSTRACT

A shower head structure includes a main body, a face plate, and a switching device installed inside the main body for controlling an outflow of water from the face plate. The circumferential portion of the face plate is provided with a plurality of water outlet units. Each water outlet unit includes a plurality of jet orifices. The water flowing from the plurality of jet orifices forms a bunched spout. The bunched spout includes a plurality of fine spouts. The water won't spray about. Since the diameter of the jet orifice is small, the force of the fine spouts is stronger. The water-saving effect is good. The shower head can be used for low pressure environment.

6 Claims, 9 Drawing Sheets

SHOWER HEAD STRUCTURE

BACKGROUND OF THE INVENTION

1. Field of the Invention

The present invention relates to a bathroom accessory, and more particularly to a shower head structure able to flow out a bunched spout of water.

2. Description of the Prior Art

With the social development and the improvement of people's living standards, people pay more and more attention to the quality of life and also pay more attention to the environmental-friendly products. For taking a shower, people began to pay attention to the feeling of the water flow and the water-saving effect. The outflow of water of the existing shower head is unable to provide physical ease and relaxation. The water sprays about, and the water-saving effect is not good.

Accordingly, the inventor of the present invention has devoted himself based on his many years of practical experiences to solve this problem.

SUMMARY OF THE INVENTION

The primary objective of the present invention is to provide a shower head structure which can increase the force of the outflow of water effectively. The water flow is bubble water for the user to feel soft and comfortable. The water won't spray about. The water-saving effect is good. The shower head of the present invention is suitable for low pressure environment.

In order to achieve the aforesaid objective, the shower head structure of the present invention comprises a main body, a face plate, and a switching device installed inside the main body for controlling an outflow of water from the face plate. The face plate is provided with at least one water outlet unit, and the water outlet unit includes at least two jet orifices.

Preferably, the shower head structure further comprises a bubbler installed in a middle portion of the face plate. The water outlet unit is disposed on a circumferential portion of the face plate around the bubbler.

Preferably, the main body comprises a housing and a water diversion body.

Preferably, the casing and the water diversion body are separate structures to be assembled together.

Preferably, the casing is integrally formed with the water diversion body.

Preferably, the number of the at least one water outlet unit of the face plate is plural.

Preferably, the number of the at least two jet orifices of the water outlet unit is plural.

Preferably, the jet orifices each have a diameter of 0.5 mm-0.7 mm.

Preferably, a distance between the jet orifices is more than 1 mm.

Preferably, the water outlet unit has a shape formed by the jet orifices arranged in a circular, oval, pentagonal, triangular, or crescent shape on the face plate.

The face panel of the present invention has a plurality of water outlet units. Each water outlet unit includes a plurality of jet orifices. The water flowing from the plurality of jet orifices forms a bunched spout. The bunched spout includes a plurality of fine spouts. The water won't spray about. Since the diameter of the jet orifice is small, the force of the fine spouts is stronger. The water-saving effect is good. The shower head of the present invention can be used for low pressure environment.

DETAILED DESCRIPTION OF THE PREFERRED EMBODIMENTS

Figure 1:
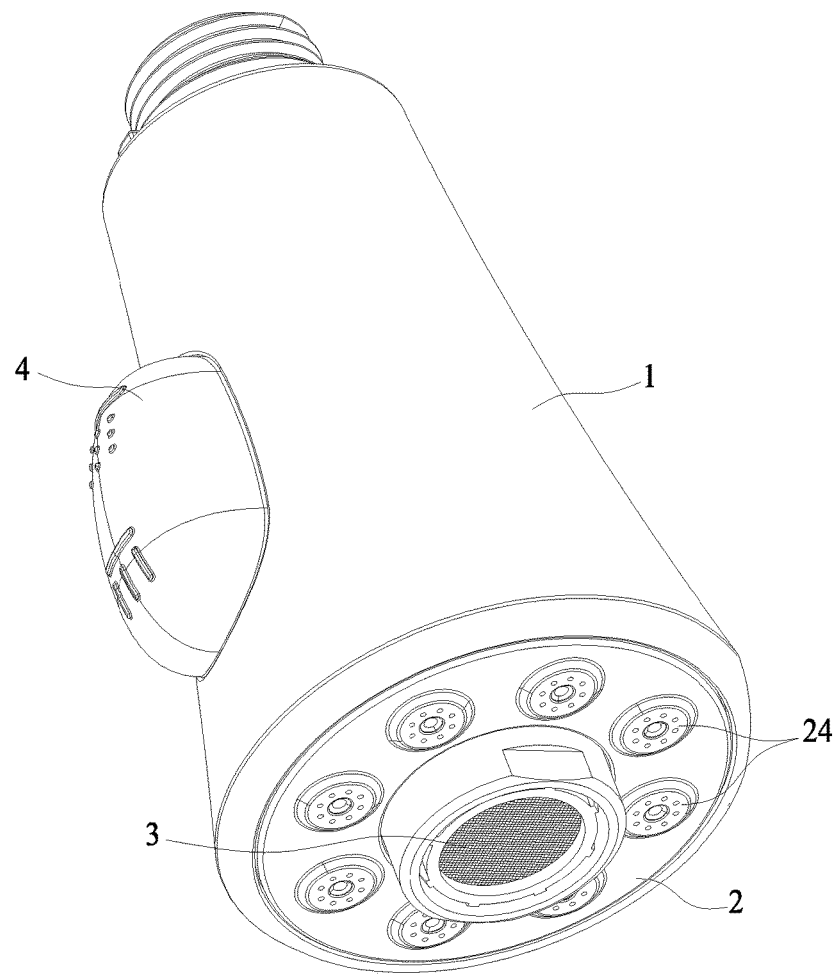
FIG. 1 is a perspective view of the present invention.
Figure 2:
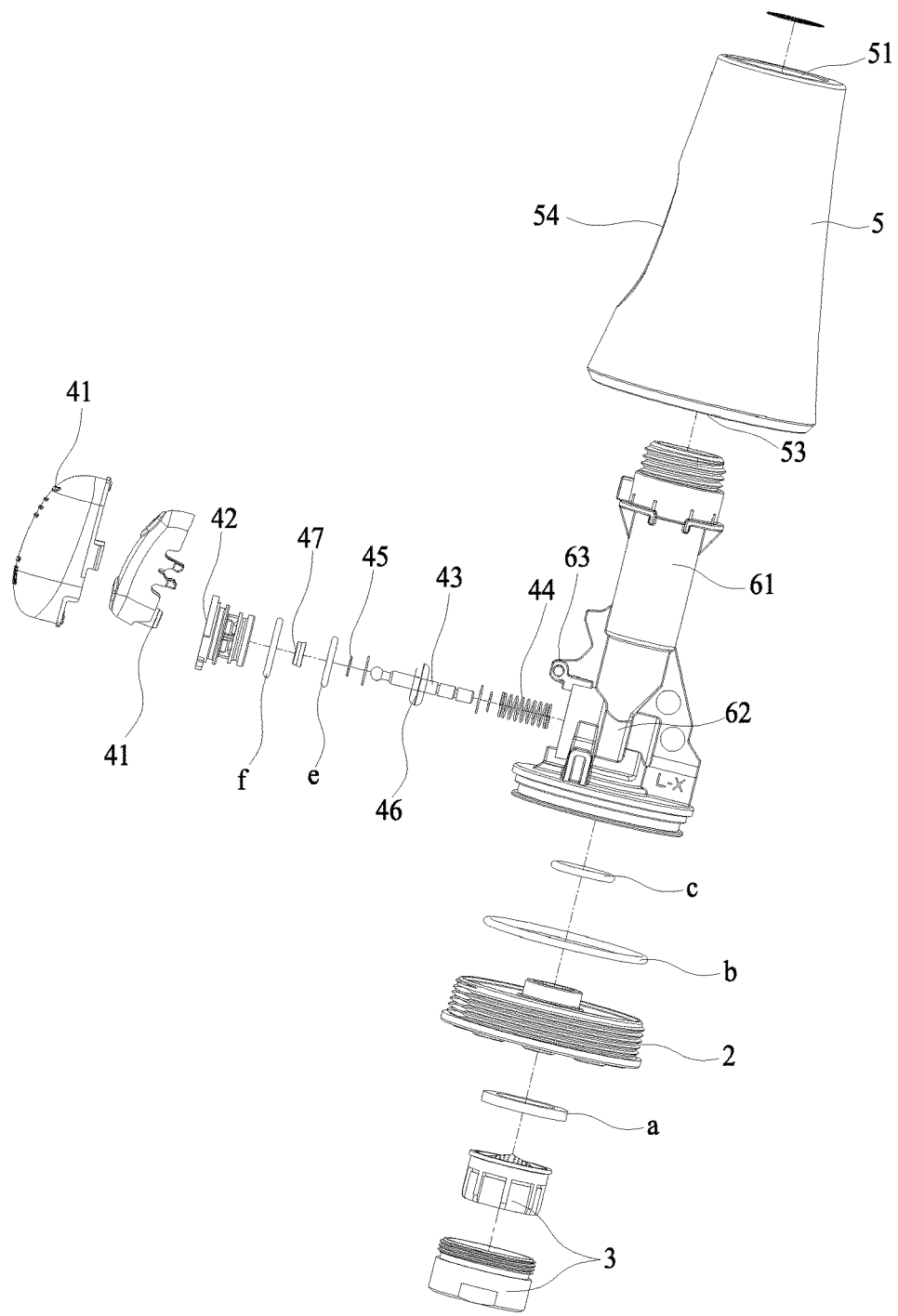
FIG. 2 is an exploded view of the present invention.
Figure 3:
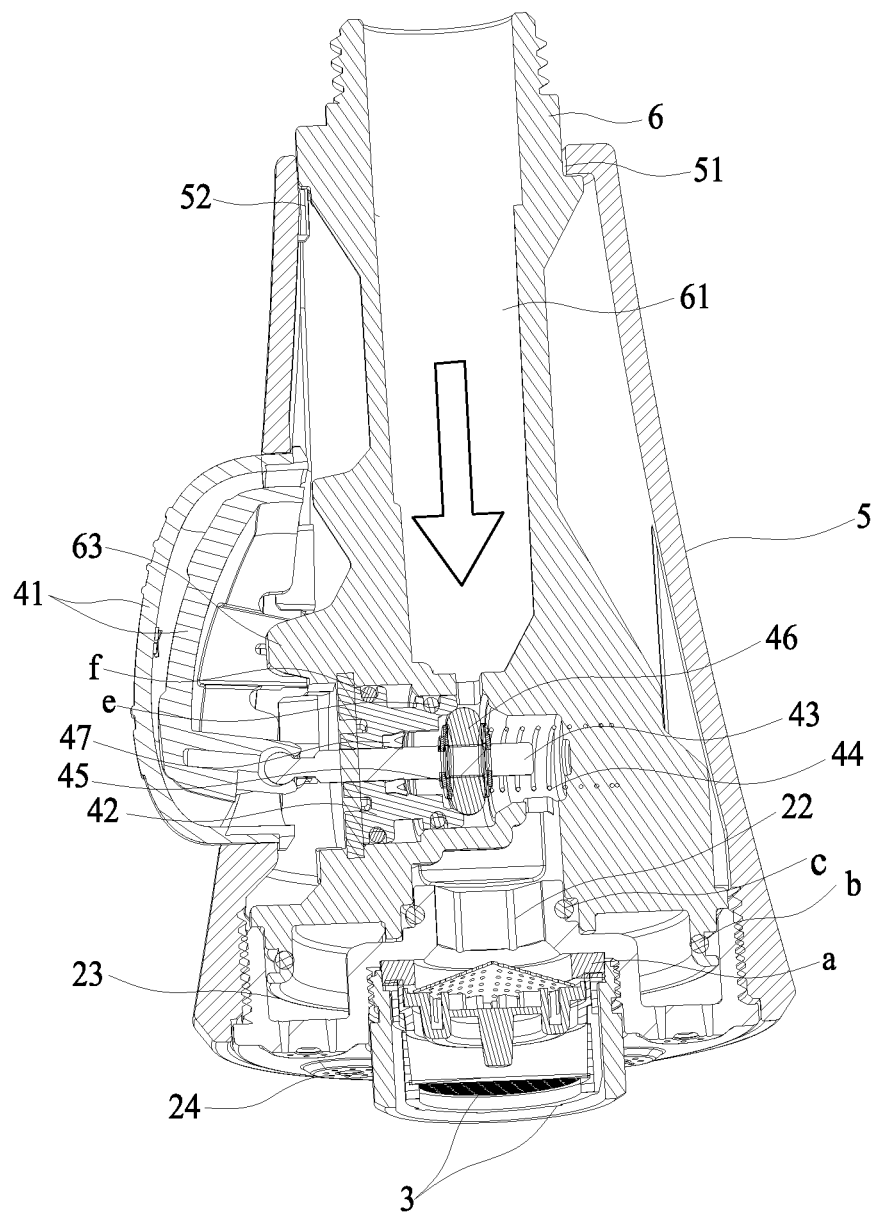
FIG. 3 is a sectional view of the present invention.
Figure 4:
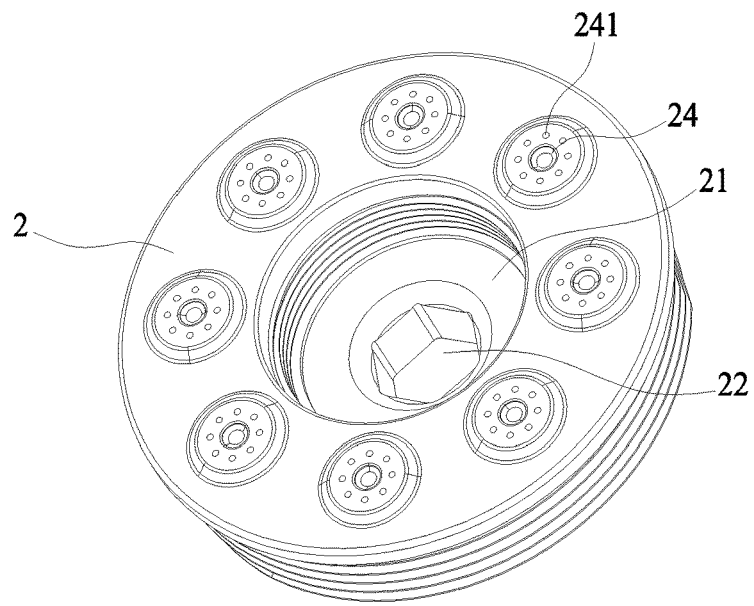
FIG. 4 is a front perspective view of the face panel of the present invention.
Figure 5:
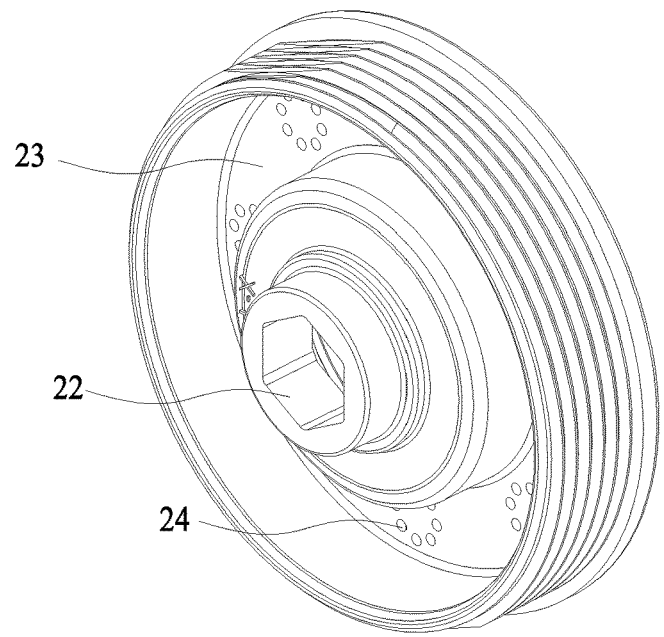
FIG. 5 is a rear perspective view of the face panel of the present invention.
Figure 6:
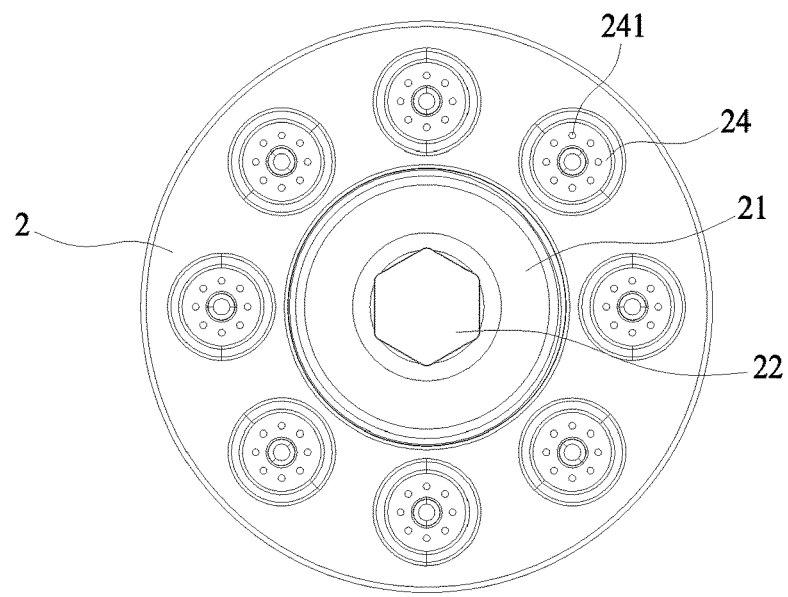
FIG. 6 is a front view of the face panel of the present invention.
Figure 7:
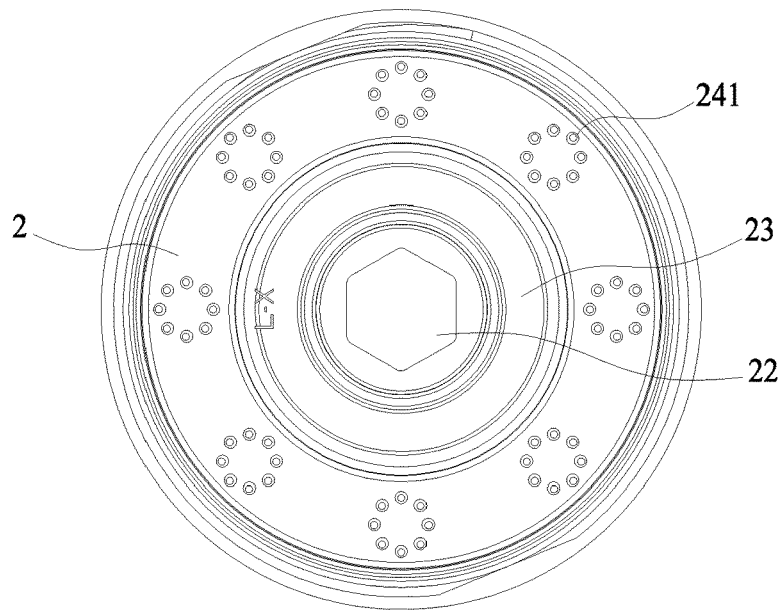
FIG. 7 is a rear view of the face panel of the present invention.
Figure 8A:
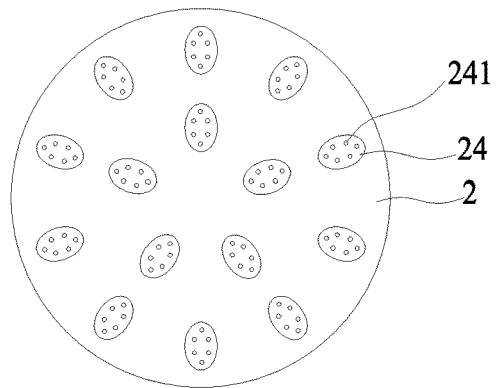
FIG. 8*a* to FIG. 8*e* are schematic views of different embodiments of the water outlet units of the present invention.
Figure 8B:
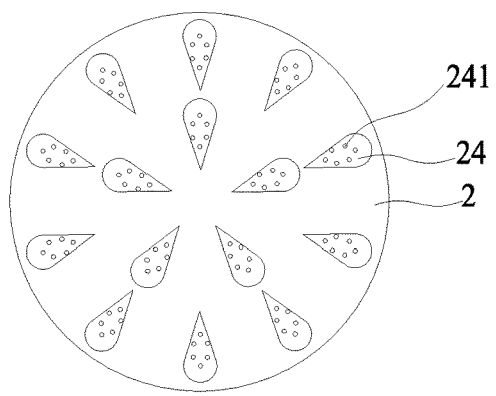
Figure 8C:
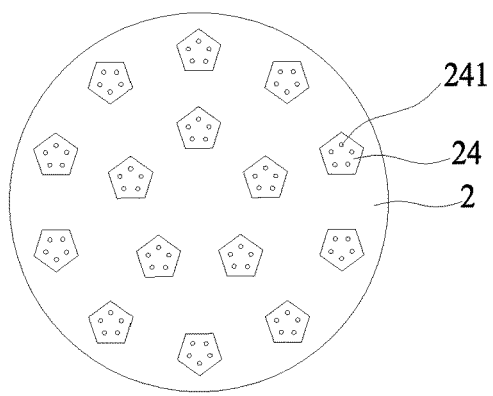
Figure 8D:
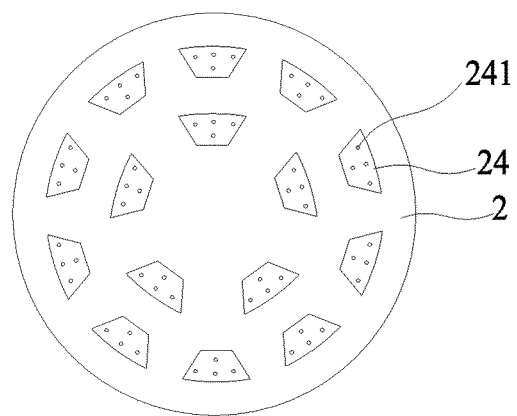
Figure 8E:
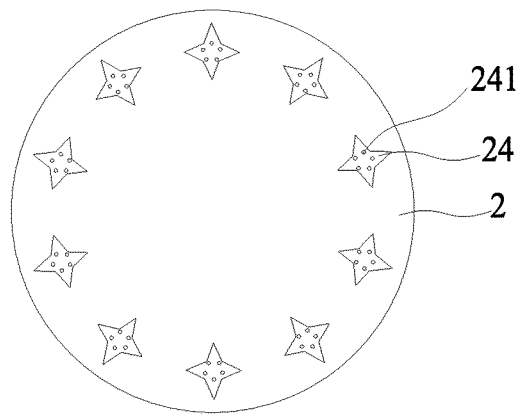

Embodiments of the present invention will now be described, by way of example only, with reference to the accompanying drawings.

As shown in FIG. 1 to FIG. 10, the present invention discloses a shower head structure. The shower head structure comprises a main body 1, a face plate 2, a bubbler 3 installed in the middle portion of the face plate 2, and a switching device 4 installed inside the main body 1 for controlling an outflow of water from the face plate 2.

The center of the front of the face plate 2 has an installation trough 21 for installation of the bubbler 3. The bubbler 3 is screwedly connected to the installation trough 21. A searing ring a is provided between the bubbler 3 and the installation trough 21. The center of the back of the face plate 2 has a cylindrical first outlet chamber 22 communicating with the installation trough 21. The back of the face plate 2 further has an annular second outlet chamber 23.

The circumferential portion of the front of the face plate 2 is provided with at least one water outlet unit 24. The water outlet unit 24 communicates with the second outlet chamber 23. The number of the water outlet unit 24 is dependent on the required water discharge amount. The water outlet unit 24 includes at least two jet orifices 241. The water outlet unit 24 is shaped by the arrangement of the jet orifices 241. As shown in FIG. 8*a* to FIG. 8*e*, the water outlet unit 24 may be in a circular, oval, pentagonal, triangular, crescent or other regular or irregular shape. That is, the water outlet unit 24 is shaped by the jet orifices 241 arranged in a regular or irregular shape on the face panel 2. The diameter of the jet orifice 241 is between 0.5 mm and 0.7 mm. The distance between the two jet orifices 241 is more than 1 mm. The face panel 2 is directly formed, or it may be made of a plastic material by injection molding or a rubber material by molding, or assembled by molding.

The main body 1 comprises a housing 5 and a water diversion body 6. The upper end of the housing 5 has an opening 51 and an inner flange 52 next to the opening 51. The lower end of the housing 5 has a connecting opening 53.

The face plate 2 is screwedly connected to the connecting opening 53. The side wall of the housing 5 has an installation hole 54 for installation the switching device 4. The upper portion of the water diversion body 6 has a water inlet passage 61. The middle portion of the water diversion body 6 has an accommodation chamber 62 for installation of the switching device 4 and at least two water outlets to respectively communicate with the first outlet chamber 22 and the second outlet chamber 23 of the face panel 2.

The switching device 4 is a push-type changeover valve which is installed in the accommodation chamber 62. The switching device 4 includes a button 41, a valve body 42, a valve shaft 43, a return spring 44, a limit ring 45, and a gasket 46. The button 41 is fitted on the top end of the valve shaft 43. The valve shaft 43 is orderly inserted through the valve body 42, the limit ring 45 and the gasket 46, and connected to the return spring 44. A sealing ring e and a sealing ring f are provided between the valve body 42 and the accommodation chamber 62 so as to ensure the waterproof and seal function. A V-shaped ring 47 is provided between the valve body 42 and the valve shaft 43. To facilitate the use of the button 41, the outer wall of the water diversion body 6 may be provided with a protruding post 63 which is rotatably connected with the button 41.

By pressing the button 41, the gasket 46 on the valve shaft 43 is moved to the set position to close one of the water outlets. For example, the gasket 46 closes one of the water outlets so that the water inlet passage 61 communicates with the second outlet chamber 23, or the gasket 46 closes the other water outlet so that the water inlet passage 61 communicates with the first outlet chamber 22.

To assemble the present invention, all the parts of the switching device 4 except the button 41 are installed in the water diversion body 6, and the water diversion body 6 is installed in the housing 5. The button 41 is installed on the valve shaft 43 and the protruding post 63 through the installation hole 54. The upper end of the water diversion body 6 is against the flange 52 of the housing 5. The face panel 2 is screwedly connected to the connecting opening 53 of the housing 5, and the face panel 2 is fitted to the lower end of the water diversion body 6 through sealing rings b and c, so that the face panel 2 is stably secured in the housing 5. Finally, the bubbler 3 is screwedly mounted to the face panel 2.

The casing 5 and the water diversion body 6 may be integrally formed, not limited to the above-described separate structures to be assembled together. The switching device 4 is not limited to the push-type switching valve, and may be a rotary-type switching valve or a slide-type switching valve.

Figure 9:
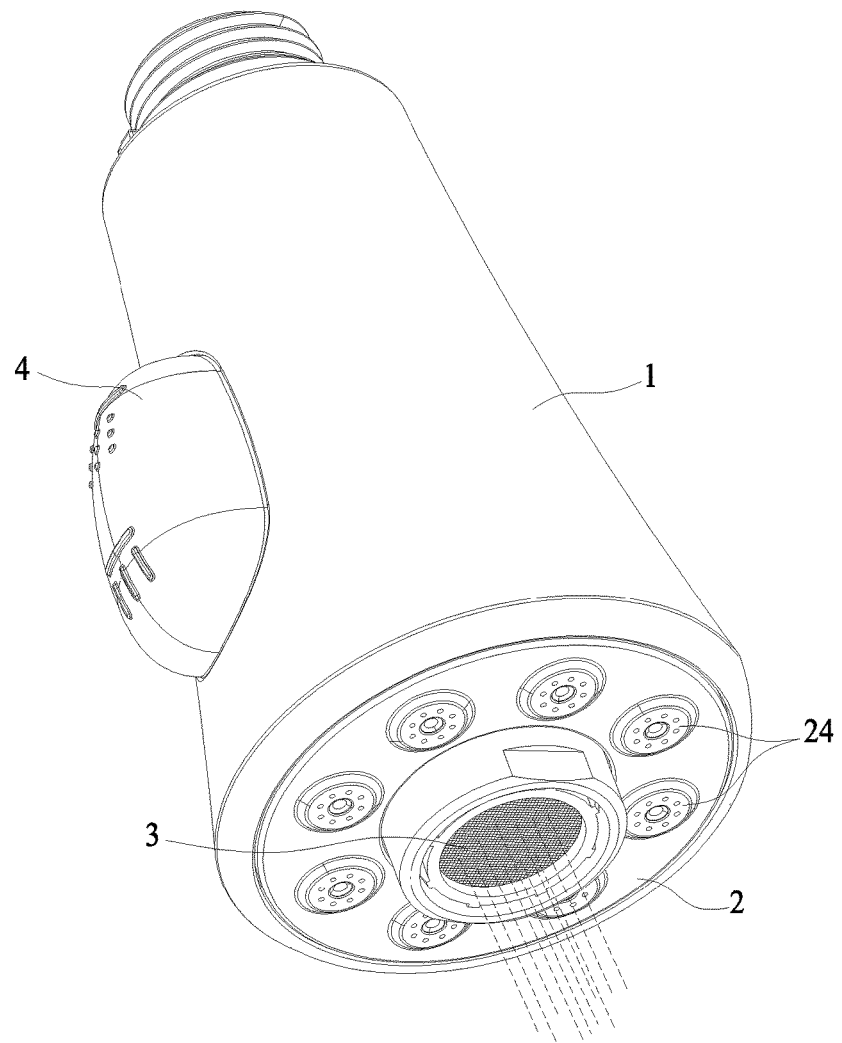
FIG. 9 is a schematic view of the present invention when in use (the water flows out from the bubbler)

To practice the present invention, referring to FIG. 9, the water flows from the water inlet passage 61 into the accommodation chamber 62. By switching the switching device 4, the water can flow out only from the bubbler 3 through the first outlet chamber 22. The water flow is bubble water so that the user may feel soft and comfortable. The water won't spray about. The water-saving effect is good.

Figure 10:
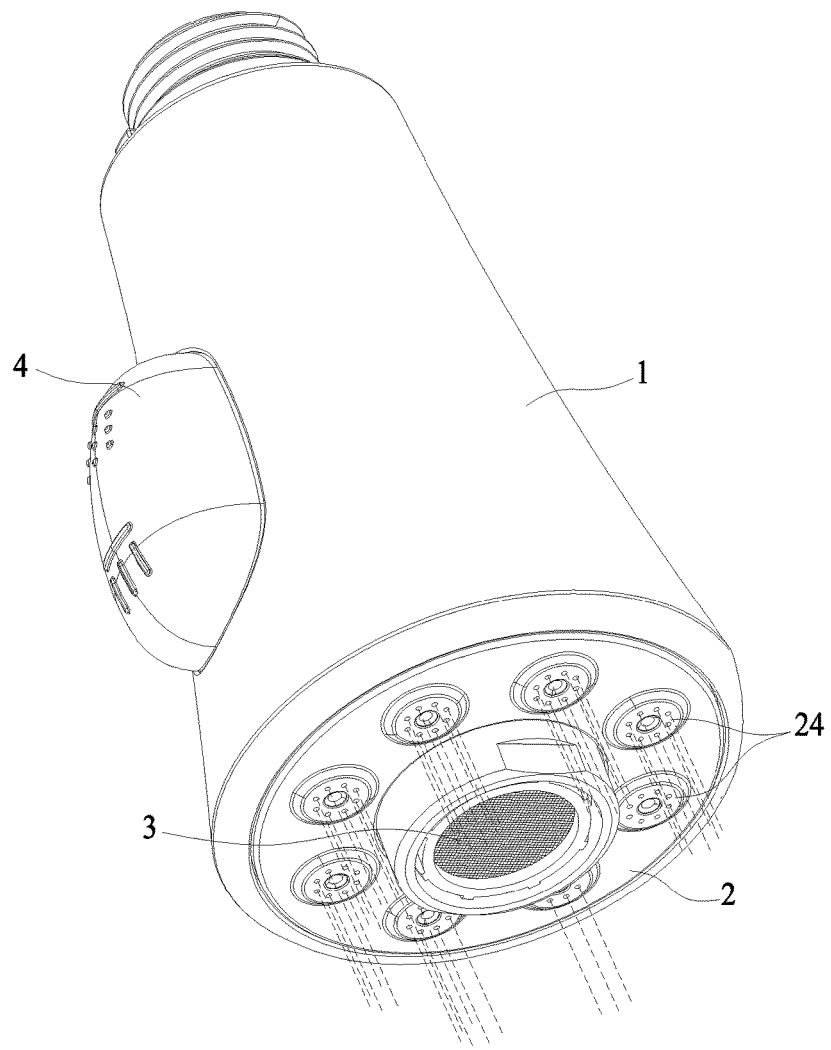
FIG. 10 is a schematic view of the present invention when in use (the water flows out from the water outlet units).

As shown in FIG. 10, the water flows from the water inlet passage 61 into the accommodation chamber 62. By switching the switching device 4, the water can be ejected only from the water outlet unit 24 through the second outlet chamber 23. The bunched water spout from each water outlet unit 24 includes a plurality of fine spouts. The water won't spray about. Since the diameter of the jet orifice 241 is small, the force of the fine spouts is stronger. The water-saving effect is good. The shower head of the present invention can be used for low pressure environment.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A shower head structure, comprising a main body, a face plate, and a switching device installed inside the main body for controlling an outflow of water from the face plate, wherein the face plate is provided with at least one water outlet unit, and the at least one water outlet unit includes at least two jet orifices;
   wherein the jet orifices each have a diameter of 0.5 mm-0.7 mm;
   wherein the at least one water outlet unit comprises plural water outlet units that are spaced from each other and each of the plural water outlet units comprises a cluster of jet orifices that includes the at least two jet orifices of the at least one water outlet unit, such that the clusters of jet orifices are spaced from each other and the at least two jet orifices of each of the clusters are spaced from each other by a predetermined distance between the jet orifices, the jet orifices of the clusters of each of the plural water outlet units being structured to jet water therefrom at the same time; and
   wherein each of the plural water outlet units has a shape formed by the jet orifices of the cluster arranged and distributed in a circular, oval, pentagonal, triangular, or crescent shape on the face plate.

2. The shower head structure as claimed in claim 1, wherein the predetermined distance between the jet orifices is more than 1 mm.

3. The shower head structure as claimed in claim 1, further comprising a bubbler installed in a middle portion of the face plate, each of the plural water outlet units being disposed on the circumferential portion of the face plate around the bubbler such that the clusters of jet orifices are arranged circumferentially around the bubbler.

4. The shower head structure as claimed in claim 1, wherein the main body comprises a housing and a water diversion body.

5. The shower head structure as claimed in claim 4, wherein the housing and the water diversion body are separate structures to be assembled together.

6. The shower head structure as claimed in claim 4, wherein the housing is integrally formed with the water diversion body.

* * * * *